United States Patent
Cummins et al.

(10) Patent No.: US 10,083,427 B2
(45) Date of Patent: Sep. 25, 2018

(54) METHOD FOR RECEIVING AN ELECTRONIC RECEIPT OF AN ELECTRONIC PAYMENT TRANSACTION INTO A MOBILE DEVICE

(71) Applicant: MASTERCARD INTERNATIONAL INCORPORATED, Purchase, NY (US)

(72) Inventors: Oran Cummins, Dublin (IE); Bensam Joyson, Singapore (SG); Donghao Huang, Singapore (SG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 858 days.

(21) Appl. No.: 14/291,570

(22) Filed: May 30, 2014

(65) Prior Publication Data

US 2014/0358788 A1    Dec. 4, 2014

(30) Foreign Application Priority Data

May 31, 2013    (SG) ................ 201304242-9

(51) Int. Cl.
  *G06Q 40/00*    (2012.01)
  *G07D 11/00*    (2006.01)
  (Continued)

(52) U.S. Cl.
  CPC ......... *G06Q 20/0453* (2013.01); *G06Q 20/32* (2013.01); *G06Q 20/385* (2013.01)

(58) Field of Classification Search
  CPC ........ G06Q 40/00; G06Q 20/00; G07D 11/00; G07F 19/00; G06F 17/00; G06K 19/00
  (Continued)

(56) References Cited

U.S. PATENT DOCUMENTS 8,352,323 B2    1/2013    Fisher
8,751,316 B1 *  6/2014    Fletchall .............. G07G 1/0081
                                                            705/16
(Continued)

FOREIGN PATENT DOCUMENTS

WO    WO2011/127354    10/2011
WO    WO2012/143547    10/2012

*Primary Examiner* — Edwyn Labaze
(74) *Attorney, Agent, or Firm* — Harness, Dickey & Pierce, P.L.C.

(57) ABSTRACT

According to one embodiment of the present disclosure, there is provided a method for receiving an electronic receipt of an electronic payment transaction into a mobile device, the method comprising: storing, into an installed application in the mobile device used to perform the electronic payment transaction, a unique transaction identity issued on the electronic payment transaction; generating, in a server, an electronic receipt issued on the electronic payment transaction; verifying that the electronic receipt matches against the unique transaction identity stored in the installed application; and receiving the electronic receipt into the mobile device in response to the verifying step determining that the electronic receipt matches against the unique transaction identity stored in the installed application. Also provided is a mobile device for receiving an electronic receipt of an electronic payment transaction and a system for receiving an electronic receipt of an electronic payment transaction into a mobile device.

15 Claims, 8 Drawing Sheets

(51) Int. Cl.
*G07F 19/00* (2006.01)
*G06Q 20/04* (2012.01)
*G06Q 20/32* (2012.01)
*G06Q 20/38* (2012.01)

(58) Field of Classification Search
USPC .................. 235/379, 375, 487; 705/75, 79
See application file for complete search history.

(56) References Cited

U.S. PATENT DOCUMENTS

| | | | | |
|---|---|---|---|---|
| 2003/0055733 | A1* | 3/2003 | Marshall | G06Q 20/0453 705/24 |
| 2006/0165060 | A1* | 7/2006 | Dua | G06Q 20/20 370/352 |
| 2008/0059375 | A1* | 3/2008 | Abifaker | G06Q 20/04 705/44 |
| 2009/0271265 | A1* | 10/2009 | Lay | G06Q 20/0453 705/14.38 |
| 2009/0313132 | A1 | 12/2009 | McKenna et al. | |
| 2011/0022463 | A1* | 1/2011 | Harris | G06Q 20/04 705/14.51 |
| 2011/0125598 | A1 | 5/2011 | Shin et al. | |
| 2012/0179531 | A1* | 7/2012 | Kim | G06Q 30/0601 705/14.26 |
| 2013/0110659 | A1 | 5/2013 | Phillips et al. | |
| 2013/0212017 | A1* | 8/2013 | Bangia | G06Q 20/20 705/44 |
| 2013/0218721 | A1* | 8/2013 | Borhan | G06Q 20/322 705/26.41 |
| 2013/0238455 | A1* | 9/2013 | Laracey | G06Q 20/108 705/21 |
| 2014/0180856 | A1* | 6/2014 | Lau | G06Q 20/3278 705/21 |
| 2014/0279420 | A1* | 9/2014 | Okerlund | G06Q 40/00 705/39 |
| 2014/0316919 | A1* | 10/2014 | Li | G06Q 30/06 705/23 |

* cited by examiner

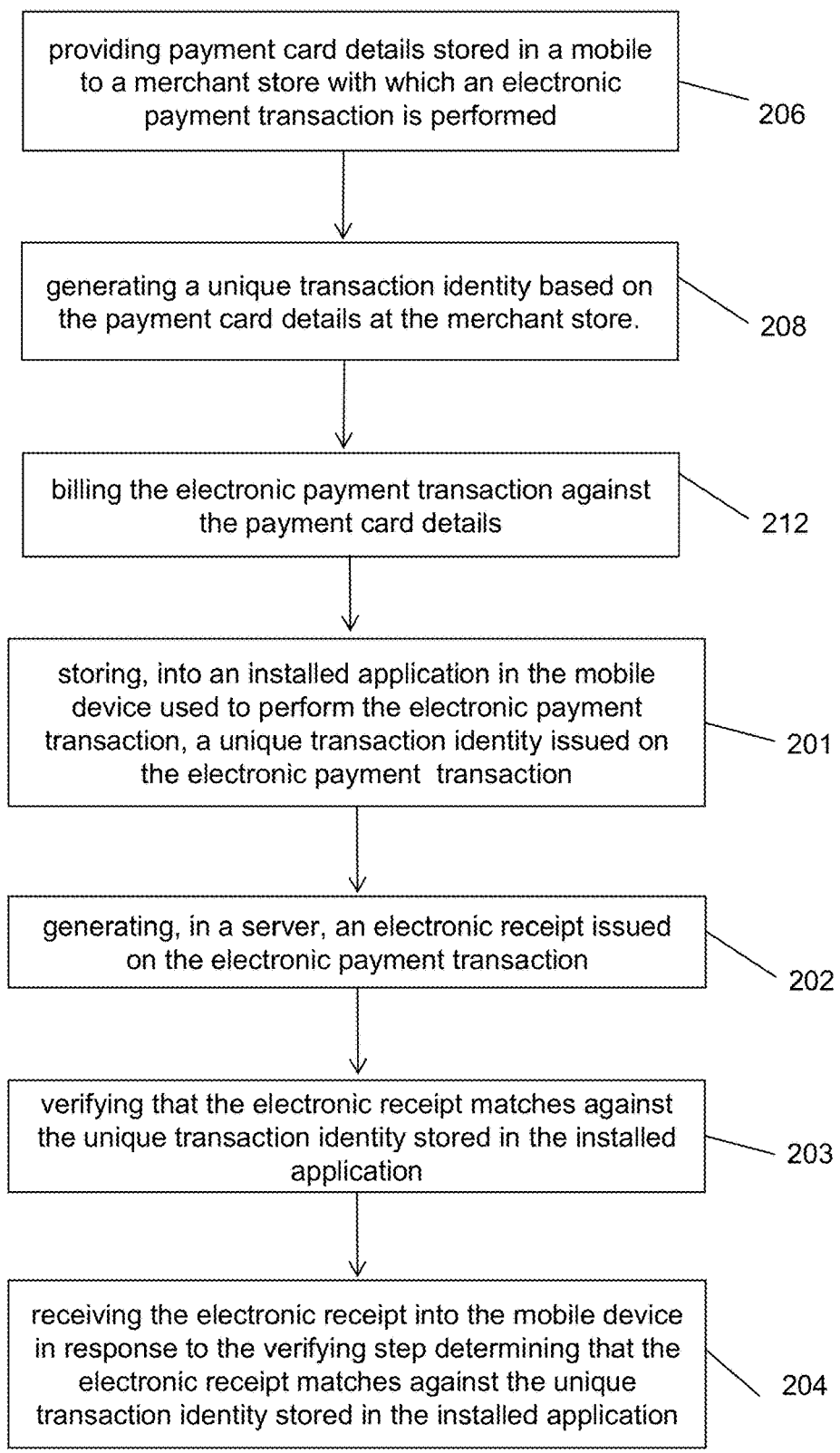

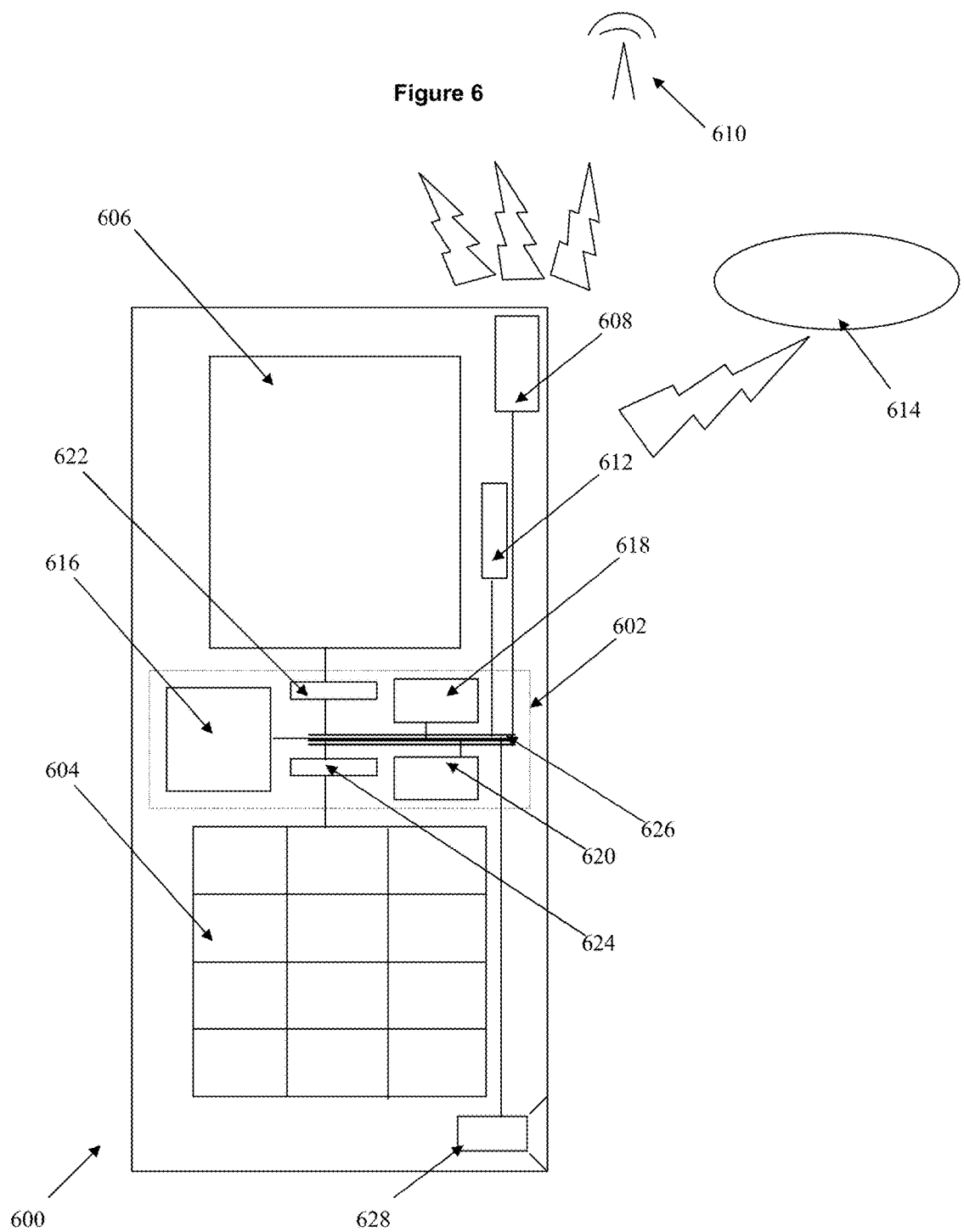

METHOD FOR RECEIVING AN ELECTRONIC RECEIPT OF AN ELECTRONIC PAYMENT TRANSACTION INTO A MOBILE DEVICE

CROSS-REFERENCE TO RELATED APPLICATION

This application claims the benefit of and priority to Singapore Application No. 201304242-9 filed May 31, 2013. The entire disclosure of the above application is incorporated herein by reference.

FIELD

The present disclosure generally relates to methods, systems and mobile devices for use in conducting electronic payment transactions.

BACKGROUND

Credit/debit cards typically come with benefits that are enjoyed when they are used to make payment on purchases. Such benefits include discounts and rebates, which may be the result of agreements that the issuing bank of such credit cards make with business partners or merchant stores offering these benefits. It is thus common for individuals to own one or more credit cards, so as to enjoy as many benefits as possible. However, it becomes difficult for the individual to carry all his or her owned credit cards, just to ensure that all benefits are made available.

With mobile devices, such as smart phones, now being capable of greater processing capability, the difficulty of carrying all owned credit cards is alleviated by mobile device applications, such as a mobile wallet application, that can be used to store all credit card details into such mobile devices.

However, even with such mobile device applications being able to store all credit card details into a single location, the credit card details still need to be registered with a server before they can be used to perform electronic payment transactions. Such registration is not automatic and requires effort and time, which can be discouraging to less technically savvy individuals. In addition, such mobile device applications still carry over limitations from the traditional swiping of a credit card, in that paper receipts issued by merchant stores on the credit card payment only provide a total amount billed on the credit card, with no cost break-down. The owner has to keep a copy of all such paper receipts if he or she wishes to tally them against the monthly statement of account issued on the credit card. The merchant store also has to stock a supply of the paper upon which the receipts are printed.

SUMMARY

According to one embodiment of the present disclosure, there is provided a method for receiving an electronic receipt of an electronic payment transaction into a mobile device, the method comprising: storing, into an installed application in the mobile device used to perform the electronic payment transaction, a unique transaction identity issued on the electronic payment transaction; generating, in a server, an electronic receipt issued on the electronic payment transaction; verifying that the electronic receipt matches against the unique transaction identity stored in the installed application; and receiving the electronic receipt into the mobile device in response to the verifying step determining that the electronic receipt matches against the unique transaction identity stored in the installed application.

According to another embodiment of the present disclosure, there is provided a mobile device for receiving an electronic receipt of an electronic payment transaction, the mobile device comprising: at least one processor; and at least one memory including computer program code created by an installed application in the mobile device used to perform the electronic payment transaction, the at least one memory and the computer program code configured to, with the at least one processor, cause the mobile device to perform the steps of: storing, into the installed application in the mobile device, a unique transaction identity issued on the electronic payment transaction; generating, in a server, an electronic receipt issued on the electronic payment transaction; and receiving the electronic receipt into the mobile device, after verifying that the electronic receipt matches against the unique transaction identity stored in the installed application.

According to a further embodiment of the present disclosure, there is provided a system for receiving an electronic receipt of an electronic payment transaction into a mobile device, the system comprising: a merchant store having a processor configured to generate a unique transaction identity for the electronic payment transaction; transmit the unique transaction identity to the mobile device for storing into an installed application in the mobile device; and a server having a processor configured to generate an electronic receipt issued on the electronic payment transaction; and transmit the electronic receipt to the mobile device after verifying that the electronic receipt matches against the unique transaction identity stored in the installed application.

DRAWINGS

Embodiments of the present disclosure will be better understood and readily apparent to one of ordinary skill in the art from the following written description, by way of example only, and in conjunction with the drawings, in which:

FIG. 2B shows a sequence of possible additional steps to the flowchart of FIG. 2A.

FIG. 6 shows a schematic of a communication device for implementing the mobile device of FIG. 4.

DEFINITIONS

Figure 1:
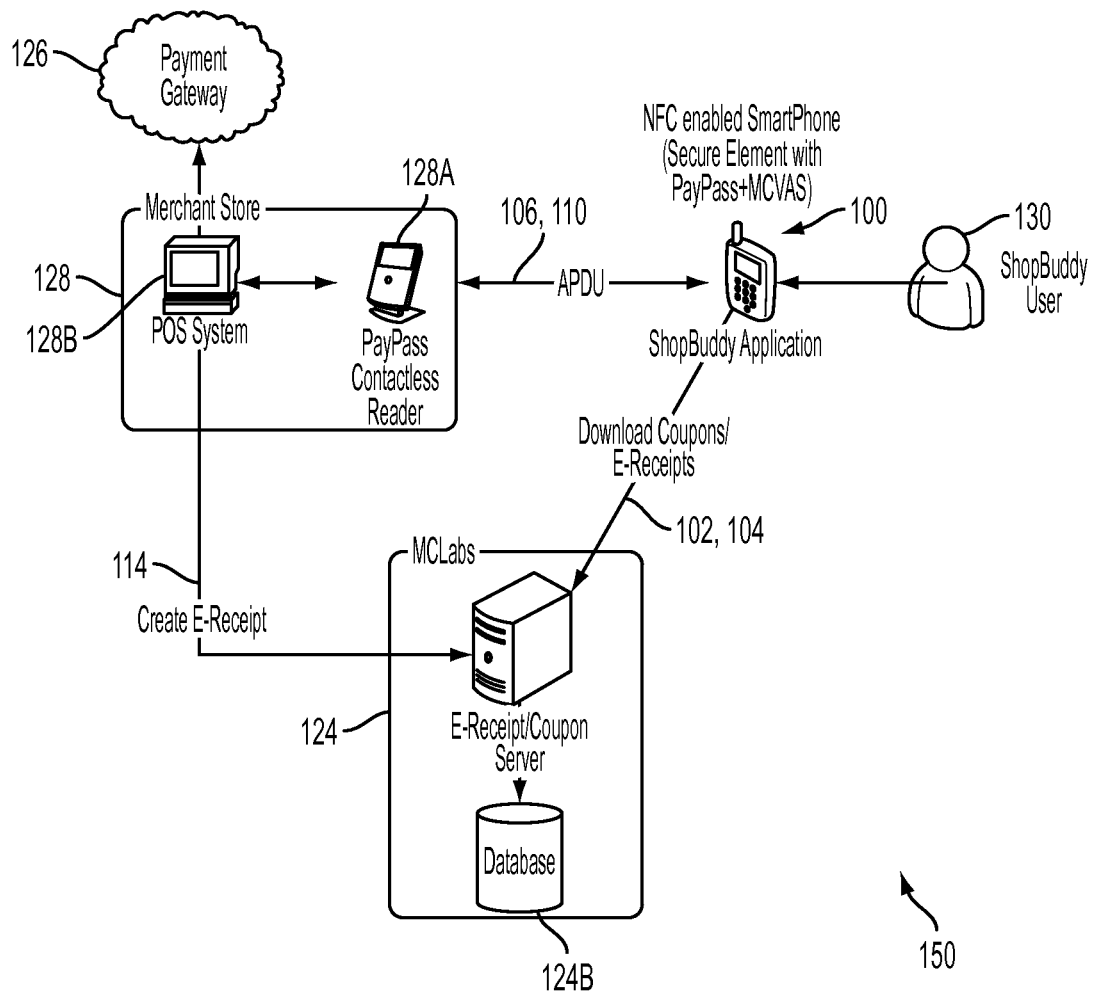
FIG. 1 shows a schematic of a system, in accordance with an exemplar embodiment, for conducting an electronic payment transaction using an installed application in a mobile device.

The following provides sample, but not exhaustive, definitions for expressions used throughout various embodiments disclosed herein. It will be appreciated that these expressions are used in a manner that will be apparent to the person skilled in the art of computer science.

The term "installed application" comprises software that configures the mobile device with program code that allows the mobile phone to identify a server where an electronic receipt, issued on an electronic payment transaction, is generated.

The term "mobile device" comprises a platform with processing capability and a memory, such as a mobile phone (e.g. the iPhone™ from Apple™ or any phone using the "Android" OS and a tablet computer).

The term "server" comprises to a computer hardware system dedicated to running one or more services, as a host computer, to serve the needs of users of other computers in a network, such as the Internet or an Intranet.

The term "electronic receipt" comprises an itemized (i.e. line-by-line) list of purchases that make up the electronic payment transaction.

The term "match" comprises a fit between the identification data embedded in the electronic receipt and the unique transaction identity, which is used to locate the electronic receipt amongst those others generated by the server.

The term "payment card" comprises debit, credit, prepaid, ATM (automated teller machine) and POS (point-of-sale) cards.

The term "merchant store" comprises a business with which the electronic payment transaction occurs. The merchant store may include one or more computer terminals each having a respective processor configured to process electronic payment transactions based on payment cards.

The term "processor" comprises an electronic device that is programmable to store instructions and subsequently execute these stored instructions. The electronic device may execute instructions to perform a logic sequence, wherein the instructions may be embedded or programmable by a user. The logic sequence may refer to the implementation of flowcharts of instructions, with the flowcharts looping at one or more portions.

DETAILED DESCRIPTION

In the following description, various embodiments of the present disclosure are described, by way of example only, with reference to the drawings, where like reference characters generally refer to the same parts throughout the different views.

Various embodiments of the present disclosure provide for real-time transmission and display of electronic receipts with line item data on a mobile device, upon successful contactless payment transaction using a near field communication (NFC) enabled mobile device.

FIG. 1 shows a schematic of a system 150, in accordance with an exemplary embodiment of the present disclosure, for conducting an electronic payment transaction using an installed application in a mobile device.

The system 150 allows the implementation of a method for receiving an electronic receipt of an electronic payment transaction into a mobile device 100. The method comprises: storing, into an installed application in the mobile device 100 used to perform the electronic payment transaction, a unique transaction identity issued on the electronic payment transaction. A server 124 generates an electronic receipt issued on the electronic payment transaction. The electronic receipt is verified to match against the unique transaction identity stored in the installed application. The electronic receipt is then received (represented by the arrow labeled 104) into the mobile device 100 in response to the verifying step determining that the electronic receipt matches against the unique transaction identity stored in the installed application.

There may be two possible ways for the electronic receipt to be received into the mobile device 100. In one embodiment of the present disclosure, the system 150 pushes the electronic receipt from the server 124 into the mobile device 100. In such an embodiment, the server 124 locates the mobile device 100 used to perform the electronic payment transaction for verification of the electronic receipt. In another embodiment of the present disclosure, the mobile device 100 queries the server 124 for the electronic receipt. In such an embodiment, the installed application in the mobile device 100 queries the server 124 for verification of the electronic receipt.

The system 150 comprises a merchant store 128 having a processor configured to receive payment card details (represented by the arrow labeled 106) stored in the mobile device 100, from which the electronic payment transaction is performed. The processor of the merchant store 128 generates a unique transaction identity and transmits the unique transaction identity (represented by the arrow labeled 110) to the mobile device 100 for storing into the installed application. The unique transaction identity is also sent to the server 124, for use with the electronic receipt generated by the server 124 in respect of the electronic payment transaction. With this unique transaction identity, the generated electronic receipt can be matched against the same unique transaction identity stored in the installed application in the mobile device 100, whereby the generated electronic receipt can then be received into the mobile device 100. As an alternative—or in addition to matching the unique transaction identity stored by the installed application and the unique transaction identity found in the electronic receipt—the verification that the electronic receipt matches against the unique transaction identity stored in the installed application can be performed by verifying information associated with the unique transaction identity. Such information associated with the unique transaction identity may include any one or more of the following: details of the payment card used for the electronic payment transaction (such as the last 4 digits of a credit card) and the time of the electronic payment transaction.

The unique transaction identity is generated at the merchant store 128 based on details from any one or more of the following: the payment card, the electronic receipt and the merchant store 128. For instance, the unique transaction identity can be based on a combination of an invoice number of the electronic receipt (being a unique way for the merchant store 128 to identify the invoice number) and merchant identity number (being a unique number to identify each merchant).

As shown in FIG. 1, both the transmission of the payment card details from the mobile device 100 to the merchant store 128 and the transmission of the unique transaction identity from the merchant store 128 to the mobile device 100 is done wirelessly. The installed application that stores the unique transaction identity to facilitate an electronic payment transaction according to various embodiments of the present disclosure, including the one of FIG. 1, may be an applet application, such as MCVAS (MasterCard™ value added service, developed by MasterCard™).

MCVAS is an interoperable JavaCard applet that works on JavaCard 2.2 (and above) smartcards. The applet has to be provisioned either in a secure element (such as a Subscriber Identity Module Card) provided by a MNO (Mobile Network Operator) or in a secure element chip which is part of the mobile device 100 hardware. The MCVAS applet has its own internal memory to store data related to electronic receipt transactions. A POS (point of sale) contactless terminal (labelled 128A) at the merchant store 128 will supply transaction data (which includes the unique transaction identity) to the MCVAS Applet installed in the mobile device 100. Subsequently, the MCVAS applet can be queried to obtain the transaction data.

Optionally, the merchant store 128 may further comprise a contactless sensor 128A that obtains the payment card details from the mobile device 100. In such an embodiment, the mobile device 100 may be a near field communication (NFC) enabled mobile phone, having a secure element, such as a NFC SIM (Subscriber Identity Module) card to facilitate wireless communication with the contactless sensor 128A. The mobile device 100 may also have a mobile wallet application (such as "PayPass™") installed to allow the mobile device 100 to store details of several payment cards. A user 130 then selects the payment card for the electronic payment transaction, whereby the details of the selected payment card are provided to the merchant store 128 via the contactless sensor 128A. The contactless sensor 128A then returns the unique transaction identity to the mobile device 100.

The system 150 further comprises the server 124 that generates the electronic receipt issued on the electronic payment transaction. The server 124 has a processor configured to generate an electronic receipt issued on the electronic payment transaction. The electronic receipt may be generated after the POS terminal 128B at the merchant store 128 instructs the server 124 to do so (represented by the arrow labeled 114). When the installed application in the mobile device 100 queries the server 124 for verification of the electronic receipt, the processor of the server 124 is further configured to receive the query (represented by the arrow labeled 102), from the installed application (that facilitates an electronic payment transaction according to various embodiments) in the mobile device 100, to identify the electronic receipt that matches against the unique transaction identity stored in the installed application. This matching may be performed on a plurality of electronic receipts that may be stored in a database 124B of the server 124. The processor of the server 124 then transmits the identified electronic receipt to the mobile device 100 (represented by the arrow labeled 104). To enable pushing of the electronic receipt generated by the server 124 into the mobile device 100, the processor of the server 124 is further configured to locate the mobile device 100 used to perform the electronic payment transaction, for verification that the electronic receipt may be sent to the mobile device 100.

The system 150 may also comprise a payment gateway 126 having a processor configured to bill the electronic receipt, generated by the server 124, against the payment card details. The payment gateway 126 ensures that payment is processed, i.e. the issuing bank for the payment card indicates that it has received and approved a request to make payment on the purchases of the electronic payment transaction. In the illustrated embodiment, the merchant store 128 instructs the server 124 to generate the electronic receipt (represented by the arrow labeled 114) only after the payment gateway 126 has billed the electronic receipt against the payment card details, i.e. the electronic payment transaction is billed onto the selected payment card.

Figure 2A:
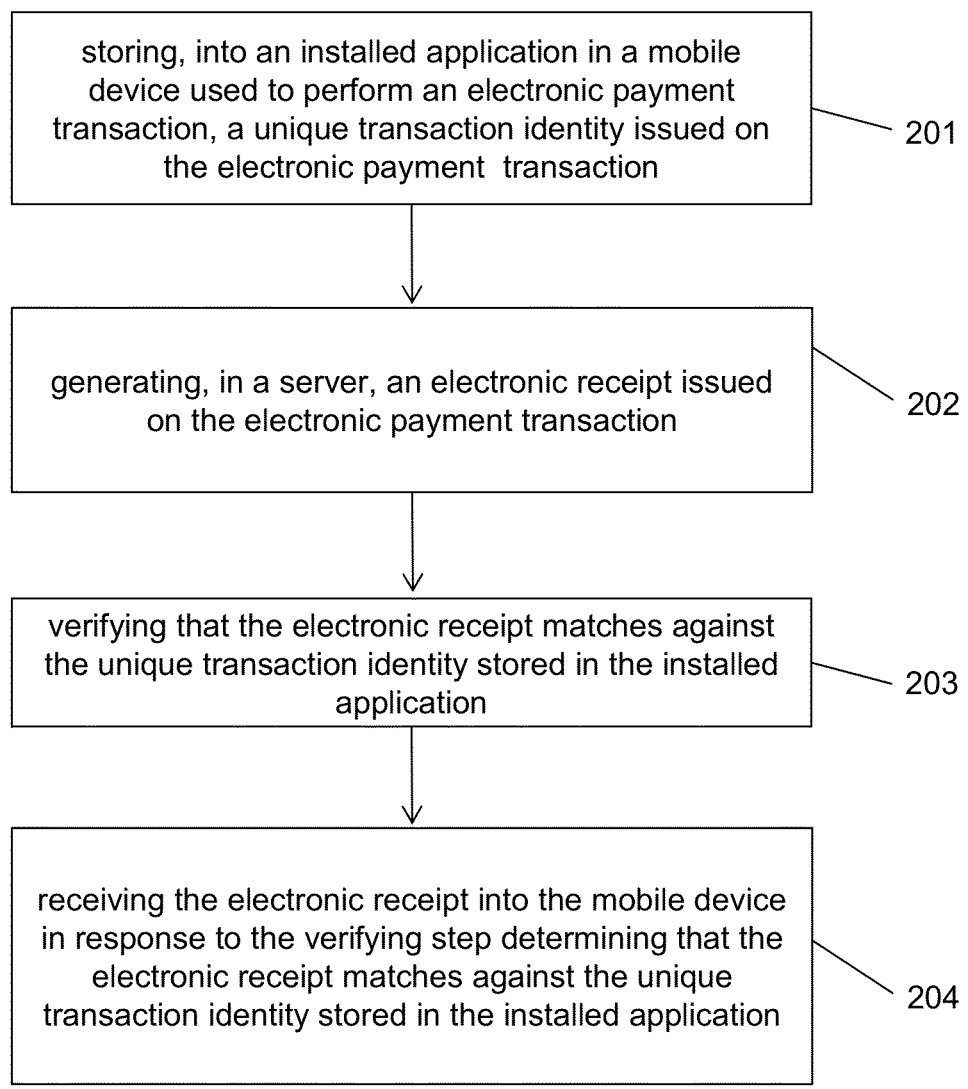
FIG. 2A shows a flowchart of the method used in the exemplary embodiment of the present disclosure implemented in the system shown in FIG. 1.

FIG. 2A shows a flowchart of the method used in the embodiment implemented in the system 150 shown in FIG. 1.

In step 201, a unique transaction identity issued on an electronic payment transaction is stored in an application configured to receive electronic receipts issued on electronic payment transactions. This application is installed in a mobile device used to perform the electronic payment transaction.

In step 202, a server generates an electronic receipt issued on the electronic payment transaction.

In step 203, the electronic receipt is verified to match against the unique transaction identity stored in the installed application.

In step 204, the electronic receipt is received into the mobile device in response to the verifying step 203 determining that the electronic receipt matches against the unique transaction identity stored in the installed application.

By using a unique transaction identity to identity the electronic receipt issued on an electronic payment transaction, the method does not require the details of the payment card used for the electronic payment transaction to be first registered with the server to have the electronic receipt returned to the mobile device that initiated the electronic payment transaction (i.e. the details of the payment card need not be first provided to the server for storage).

The embodiment shown in FIG. 2A may have the following additional steps.

The electronic receipt of step 202 may be billed against a payment card used for the electronic payment transaction. The billing may be performed at a payment gateway. The details of the payment card may be stored in the mobile device and provided directly from the mobile device to a merchant store with which the electronic payment transaction is performed. These details of the payment card may be obtained by a contactless sensor provided at the merchant store. The electronic receipt generated by the server may have itemized details of the electronic payment transaction.

The unique transaction identity, used in step 201, may be received from the merchant store. After the unique transaction identity is received by the mobile device, it is stored into the installed application of the mobile device.

An exemplary sequence, in which the above additional steps occur, is illustrated in the flowchart of FIG. 2B.

In step 206, payment card details stored in the mobile device are directly provided to a merchant store with which the electronic payment transaction is performed.

In step 208, a unique transaction identity is generated at the merchant store.

In step 212, the electronic payment transaction is billed against the payment card details, for example at a payment gateway.

Steps 201 to 204 then occur in the same manner as described with respect to FIG. 2A above.

Figure 3A:
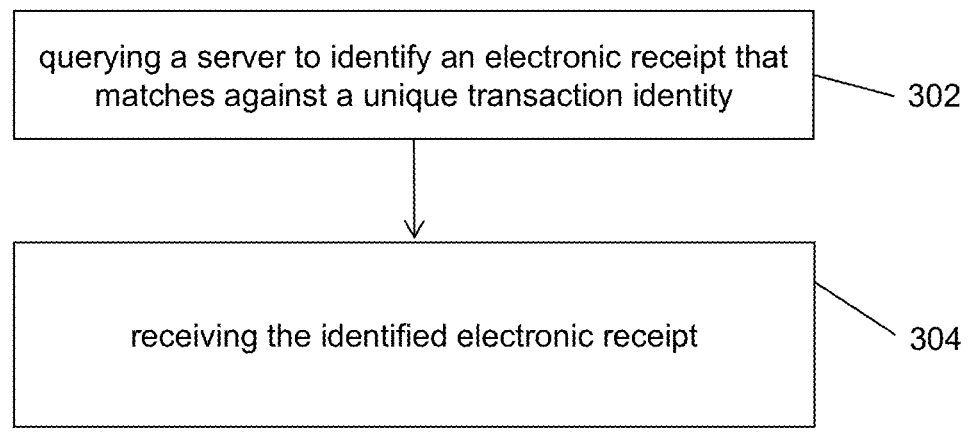
FIG. 3A shows a flowchart of a method that is in accordance with a first embodiment of the present disclosure.

FIG. 3A shows a flowchart of a method for conducting an electronic payment transaction using an installed application in a mobile device that is in accordance with a first embodiment of the present disclosure. In the method of this first embodiment of the present disclosure, an electronic receipt of an electronic payment transaction is received by querying a server for the electronic receipt.

In step 302, a server is queried, using an installed application in the mobile device, to identify an electronic receipt that matches against a unique transaction identity stored in the installed application, the electronic receipt being generated at the server and being issued on the electronic payment transaction.

In step 304, the identified electronic receipt is received into the mobile device, i.e. the server transmits the identified electronic receipt to the mobile device.

By using a transaction identity to identify the electronic receipt issued on an electronic payment transaction, the method does not require the details of the payment card used for the electronic payment transaction to be first registered with the server to have the electronic receipt sent to the mobile device (i.e. the details of the payment card need not be first provided to the server for storage). To enhance security, the installed application may provide an algorithm that encrypts the unique transaction identity stored therein, so that the unique transaction identity is encrypted when with unique transaction identity is transmitted to the server for the querying of step 302. The server may have a corresponding algorithm that can unencrypt the encrypted unique transaction identity, so that the matching of step 302 can be performed.

A second embodiment of a method for conducting an electronic payment transaction using an installed application in a mobile device builds on the first embodiment by having the following additional steps.

The electronic receipt of step 302 may be billed against a payment card used for the electronic payment transaction. The billing may be performed at a payment gateway.

The unique transaction identity, used in step 302, may be received from a merchant store, with which the electronic payment transaction is performed. After the unique transaction identity is received by the mobile device, it is stored into the installed application of the mobile device. The unique transaction identity may be generated based on details of the payment card (such as the serial number of the payment card), with the unique transaction identity being generated at the merchant store.

The details of the payment card may be stored in the mobile device and provided directly from the mobile device to the merchant store. These details of the payment card may be obtained by a contactless sensor provided at the merchant store. The electronic receipt generated by the server may have itemized details of the electronic payment transaction.

Figure 3B:
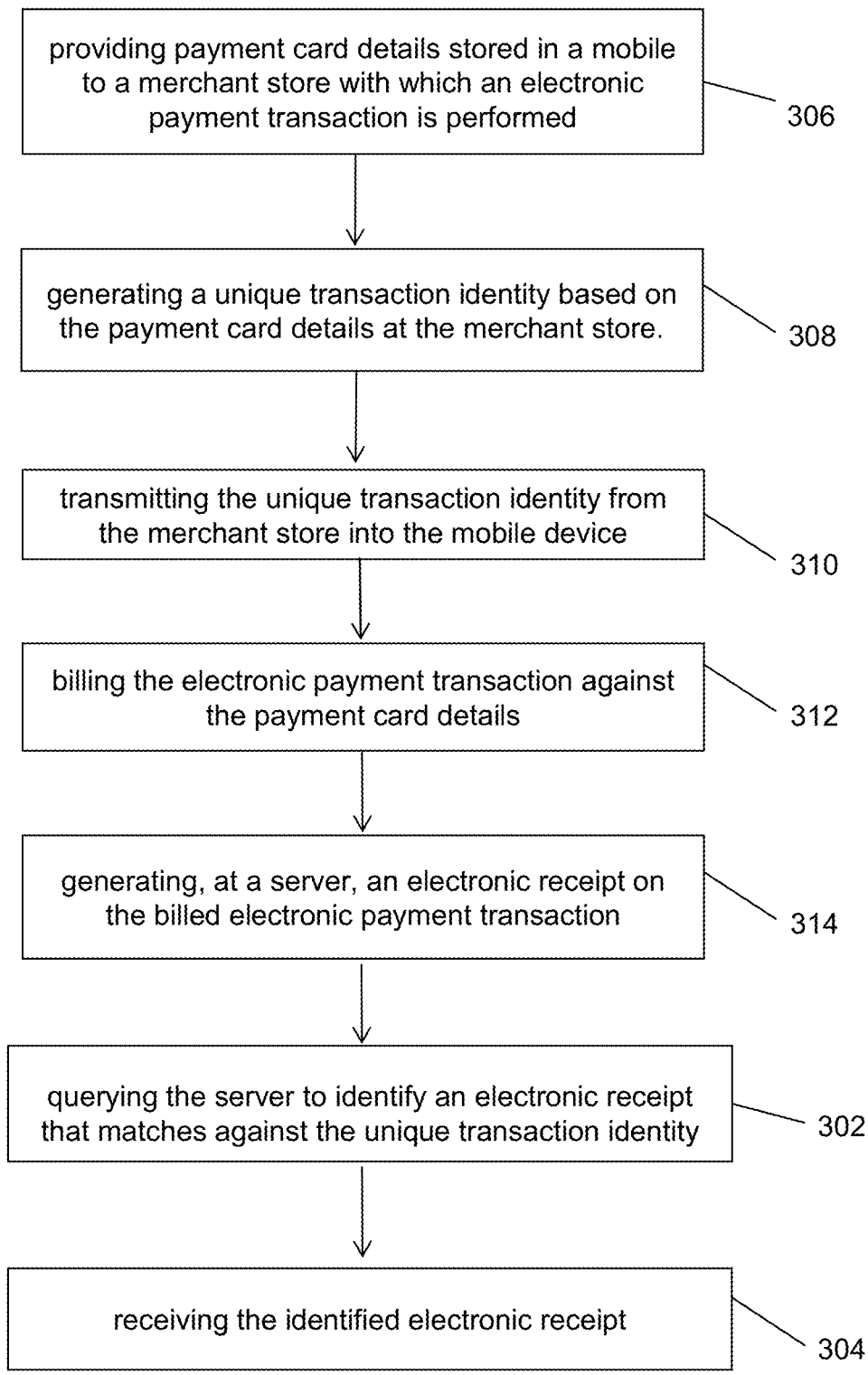
FIG. 3B shows a flowchart of a method that is in accordance with a second embodiment of the present disclosure.

An exemplary sequence, in which the above additional steps occur, is illustrated in the flowchart of FIG. 3B.

FIG. 3B shows a flowchart of a method that is in accordance with a second embodiment of the present disclosure, the method being for conducting an electronic payment transaction using an installed application in a mobile device.

In step 306, payment card details stored in the mobile device are directly provided to a merchant store with which the electronic payment transaction is performed.

In step 308, a unique transaction identity based on details from any one or more of the following: the payment card, the electronic receipt and the merchant store is generated at the merchant store.

In step 310, the unique transaction identity is transmitted from the merchant store into the mobile device for storing into the installed application.

In step 312, the electronic payment transaction is billed against the payment card details, for example at a payment gateway.

In step 314, an electronic receipt providing details on the billed electronic payment transaction is generated at a server.

In step 302, the server is queried using the installed application in the mobile device to identify the electronic receipt that matches against the unique transaction identity stored in the installed application.

In step 304, the electronic receipt is retrieved into the mobile device.

Figure 4:
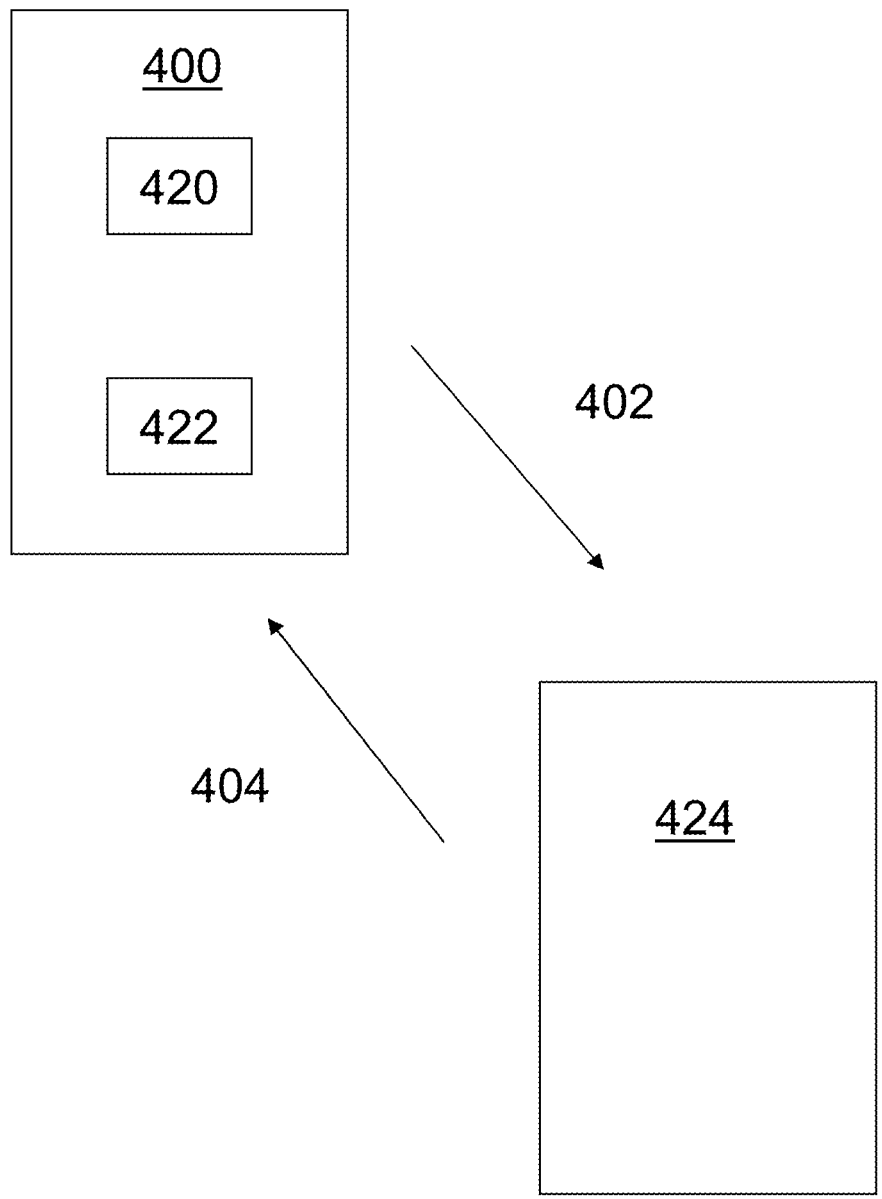
FIG. 4 shows a functional block diagram of a mobile device that implements a method that is in accordance with an exemplary embodiment of the present disclosure.

FIG. 4 shows a functional block diagram of a mobile device 400 that implements the method that is in accordance with the exemplary embodiments of the present disclosure. Accordingly, the mobile device 400 is for receiving an electronic receipt of an electronic payment transaction.

The mobile device 400 comprises at least one processor 420 and at least one memory 422 including computer program code created by an installed application in the mobile device 400 used to perform the electronic payment transaction. The at least one memory 422 and the computer program code are configured to, with the at least one processor 420, cause the mobile device 400 to store into the installed application in the mobile device 400, a unique transaction identity issued on the electronic payment transaction. A server 424 generates an electronic receipt issued on the electronic payment transaction. The electronic receipt is then received (represented by the arrow labeled 404) into the mobile device 400, after verifying that the electronic receipt matches against the unique transaction identity stored in the installed application.

There may be two possible implementations for the electronic receipt to be received into the mobile device 400. In a first implementation, the mobile device 400 is further configured to be locatable by the server 424 for verification of the electronic receipt. After the server 424 verifies through matching against the unique transaction identity stored in the installed application in the mobile device 400, the identified electronic receipt is transmitted by the server 424 to be received into the mobile device 400 (represented by the arrow labeled 404). In a second implementation, the server 424 is queried (represented by the arrow labeled 402), using the installed application in the mobile device 400. The server 424 is queried to identify the electronic receipt that matches against the unique transaction identity stored in the installed application, with the identified electronic receipt transmitted by the server 424 to be received into the mobile device 400 (represented by the arrow labeled 404).

The electronic receipt may be billed against a payment card used for the electronic payment transaction.

The mobile device 400 may be configured to further perform receiving the unique transaction identity from a merchant store (not shown), with which the electronic payment transaction is performed, for storing into the installed application. The unique transaction identity may be generated based on details from any one or more of the following: the payment card, the electronic receipt and the merchant store, with the unique transaction identity being generated at the merchant store. The mobile device 400 may be configured to further perform providing details of the payment card to the merchant store directly from the mobile device 400. Accordingly, the details of the payment card may be first stored in the mobile device 400. The mobile device 400 may additionally store details of more than one payment card, whereby it is the details of the payment card that has been selected for the electronic payment transaction that is only provided to the merchant store.

After the identified electronic receipt is received by the mobile device 400, the mobile device 400 may be configured to further perform displaying itemized details of the electronic payment transaction. In doing so, the electronic payment transaction is made available to the mobile device 400, shortly after the electronic payment transaction is performed at the merchant store.

Figure 5:
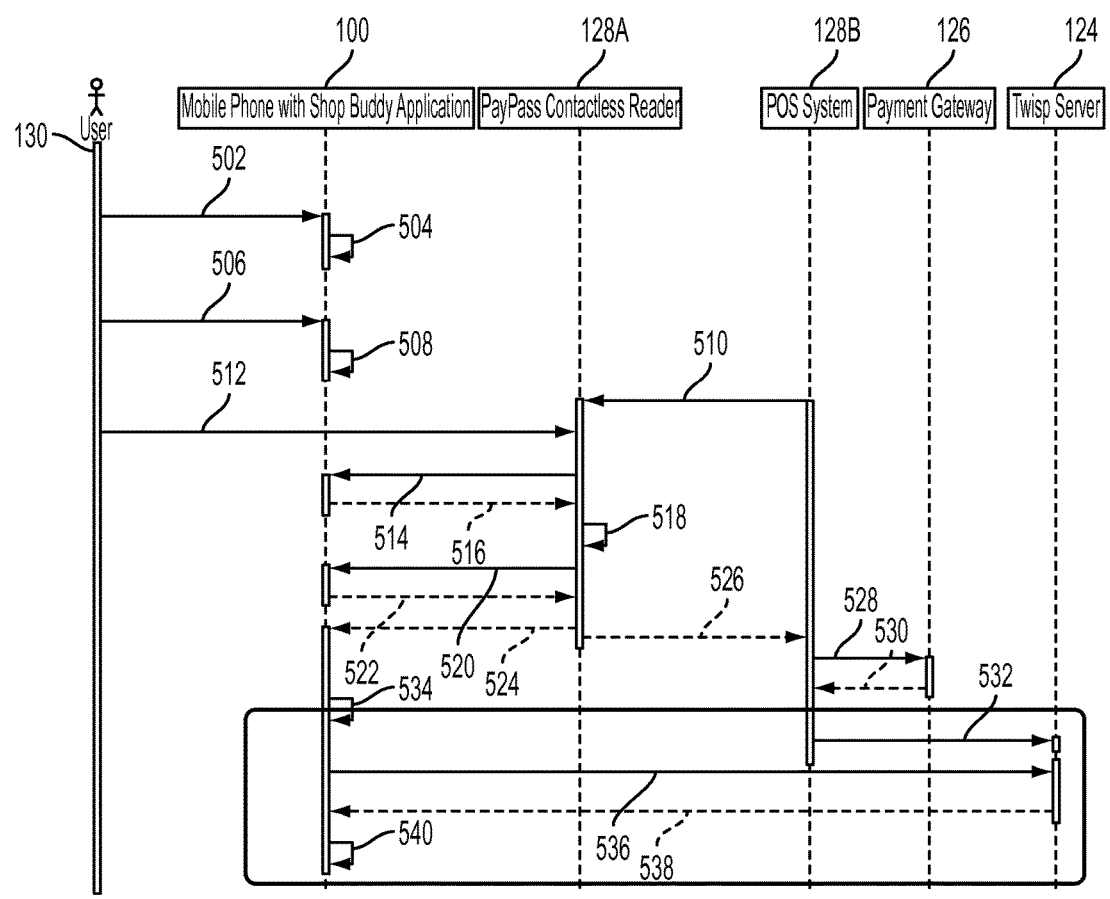
FIG. 5 shows an exemplary sequence of events, that the system of FIG. 1 may undergo when conducting an electronic payment transaction in accordance with an exemplary embodiment.

FIG. 5 shows an exemplary sequence of events, that the system 150 of FIG. 1 may undergo when conducting an electronic payment transaction in accordance with an exemplary embodiment. The user 130; the mobile phone 100; the POS terminal 128B and the contactless sensor 128A (both being components of the merchant store 128); the payment gateway 126; and the server 124 of FIG. 1 are represented in FIG. 5 using respective functional blocks bearing the same reference numerals of FIG. 1.

The sequence is described in the context of an electronic payment transaction that includes purchases of couponed items (i.e. items having an optical machine-readable representation (like a barcode or a QR code) of data, such as prices of the items and whether these items are subject to a discount arrangement). However, it will be appreciated that any of the embodiments herein will work with non-couponed items.

In step 502 of the sequence, the user 130 scans such coupons to have data relating to the coupon sent, in step 504, to the installed application. In one embodiment, the installed application is stored in a secure element of the mobile device 100, such as a NFC SIM (Subscriber Identity Module) card, so that the data relating to the coupon is sent to the secure element for subsequent further processing.

In step 506 of the sequence, the user 130 initiates a mobile wallet application to allow selection of a payment card, from a list of payment cards stored in the mobile device 100, that will be used for the electronic payment transaction. In step 508, the processor of the mobile device 100 will initiate the mobile device 100 to proceed with the electronic payment transaction against the details of the selected payment card. In one embodiment, where the secure element of the mobile device 100 is utilized, the details of the selected payment card are stored in the secure element.

Step 510 of the sequence is initiated at the merchant store 128. After all purchases are entered into the POS terminal 128B, the POS terminal 128B enables the contactless sensor 128A to receive payment card details from the mobile device 100.

In step 512 of the sequence, the user 130 taps the mobile device 100 (which as mentioned above, is NFC enabled), with both the mobile wallet application (such as "PayPass") and the installed application (such as MCVAS) in operation, against the contactless sensor 128A to make an electronic payment transaction on all the purchases that are entered into the POS terminal 128B.

Steps 514 to 518 will occur if the electronic payment transaction includes purchases of couponed items. In step 514, the coupon data is read from the installed application and returned to the contactless sensor 128A in step 516. In step 518, the coupon data is verified at the merchant store 128 and the electronic payment transaction modified, if necessary.

In step 520, the contactless sensor 128A sends a request to the mobile device 100 for the payment card details to be used for the electronic payment transaction. In step 522, the details of the selected payment card are returned to the contactless sensor 128A from the mobile device 100. In step 524, the contactless sensor 128A transmits a signal to the mobile device 100 acknowledging that the selected payment card details have been read, the signal also including a unique transaction identity to the mobile device 100. The unique transaction identity is stored in the installed application that facilitates an electronic payment transaction according to various embodiments. In the embodiment where the installed application is stored in the secure element of the mobile device 100, the unique transaction identity will also be stored in this secure element. In step 526, the contactless sensor 128A will transmit the payment card details to the POS terminal 128B. Coupon data, if any (such as that described in steps 514 to 518), will also be transmitted to the POS terminal 128B in step 526.

In step 528 of the sequence, the POS terminal 128B communicates with the payment gateway 126 to bill the electronic payment transaction against the payment card details. The status of the billing is returned to the POS terminal 128B in step 530.

In step 532 of the sequence, the POS terminal 128B sends a signal to the server 124 to generate an electronic receipt of the electronic payment transaction. The electronic receipt issued on the electronic payment transaction may have line item data for each of the purchases that make up the electronic payment transaction. In step 534 of the sequence, the mobile wallet application that is in operation at the mobile device 100 is disabled.

The remaining steps 536, 538 and 540 consider a sequence where the mobile device 100 queries the server 124 to obtain an electronic receipt of the electronic payment transaction described in steps 512 to 524 above.

In step 536 of the sequence, the mobile device 100 queries the server 124 to check the availability of the electronic receipt. This querying is undertaken even though the contactless sensor 128A has, in step 524, acknowledged that the selected payment card details have been read. This querying is performed using the installed application in the mobile device 100, to seek the electronic receipt that matches against the unique transaction identity stored in the installed application.

If a match is found, the electronic receipt is retrieved into the mobile device 100, i.e. the electronic receipt will be downloaded into the mobile device 100 in step 538. In step 540 of the sequence, details of the electronic receipt may be displayed on the mobile device 100.

Although not shown in FIG. 5, the electronic receipt may also be transmitted to the POS terminal 128B, to provide the merchant store 128 with a copy. In this manner, all parties to the electronic payment transaction, namely the mobile device 100, the merchant store 128 and the server 124 will have details of the electronic payment transaction.

The electronic receipt of the electronic payment transaction will be made available to the user of the mobile device 100 almost instantaneously, as opposed to the user having to wait for a month-end statement of account to be informed about all electronic payment transactions made on the payment card. In addition, itemized details of the electronic payment transaction is provided, as opposed to a total amount shown, for each electronic payment transaction, in the month-end statement of account. Also, having the electronic receipt generated by the server 124, as opposed to the POS terminal 128B, has the advantage of the user 130 not having to wait at the merchant store 128 for the electronic receipt to be generated, since the range of the contactless sensor 128A is limited compared to the mobile device 100 being able to query the server 124 via the Internet. There may be instances when many electronic receipts are being processed at the server 124, thus leading to delays in their generation. In such instances, the user 130 can freely leave the merchant store 128 and wait for the electronic receipt to be transmitted to the mobile device 100. Further, with the electronic receipt being downloaded into the mobile device 100, the need to print a paper receipt is eliminated, thereby providing cost savings to the merchant store 128. With all electronic receipts being stored in the mobile device 100, it also becomes easy to track expenditure made on the payment card.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods mentioned above. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described above may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the present disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the methods herein.

Various embodiments of the present disclosure may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

For instance, the mobile device 400 of FIG. 4 can be implemented on a communication device 600, schematically shown in FIG. 6. It may be implemented as software, such as a computer program being executed within the communication device 600, and instructing the communication device 600 to conduct a method of the example embodiment.

The communication device 600 comprises a processor module 602, an input module such as a keypad 604 and an output module such as a display 606.

The processor module 602 is coupled to a first communication unit 608 for communication with a cellular network 610. The first communication unit 608 can include but is not limited to a subscriber identity module (SIM) card loading bay. The cellular network 610 can, for example, be a 3G network.

The processor module 602 is further coupled to a second communication unit 612 for connection to a local area network 614. For example, the connection can enable wired/wireless communication and/or access to e.g. the Internet or other network systems such as Local Area Network (LAN), Wireless Personal Area Network (WPAN) or Wide Area Network (WAN). The second communication unit 612 can include but is not limited to a wireless network card or an Ethernet network cable port.

The processor module 602 in the example includes a processor 616, a Random Access Memory (RAM) 618 and a Read Only Memory (ROM) 620. The processor module 602 also includes a number of Input/Output (I/O) interfaces, for example I/O interface 622 to the display 606, and I/O interface 624 to the keypad 604.

The components of the processor module 602 typically communicate via an interconnected bus 626 and in a manner known to the person skilled in the relevant art.

The application, which facilitates the electronic payment transaction according to the various embodiments mentioned above, is typically supplied to the user of the communication device 600 encoded on a data storage medium such as a flash memory module, memory card/stick or even downloaded from a server, and read utilizing a corresponding memory reader-writer of a data storage device 628 for installation. The installed application is then controlled in its execution by the processor 616. Intermediate storage of program data may be accomplished using RAM 618.

It will be appreciated by a person skilled in the art that numerous variations and/or modifications may be made to the present disclosure as shown in the specific embodiments without departing from the spirit or scope of the present disclosure as broadly described. The present embodiments are, therefore, to be considered in all respects to be illustrative and not restrictive.

What is claimed is:

1. A method for receiving an electronic receipt of an electronic payment transaction into a mobile device, the mobile device including an installed application used to perform the electronic payment transaction, the installed application including a unique transaction identity for the electronic payment transaction, the method comprising:
   receiving, by a server, the unique transaction identity from a merchant store with which the electronic payment transaction is performed, the unique transaction identity generated at the merchant store for the electronic payment transaction and based on a payment card;
   generating and storing, by the server, the electronic receipt issued for the electronic payment transaction, the electronic receipt including itemized details of the electronic payment transaction;

in response to a query from the mobile device for the electronic receipt issued for the electronic payment transaction, verifying, by the server, that the electronic receipt matches against the unique transaction identity in the installed application;

transmitting, by the server, the electronic receipt to the mobile device in response to verifying that the electronic receipt matches against the unique transaction identity in the installed application, whereby the electronic receipt is received into the mobile device; and transmitting, by the server, the electronic receipt for the electronic payment transaction to the merchant store in connection with the electronic payment transaction.

2. The method of claim 1, further comprising locating, by the server, the mobile device used to perform the electronic payment transaction for verification of the electronic receipt.

3. The method of claim 1, further comprising receiving, by the server, from the installed application in the mobile device, the query for the electronic receipt.

4. The method of claim 1, wherein generating and storing the electronic receipt includes generating and storing the electronic receipt only after the electronic receipt is billed against the payment card used for the electronic payment transaction.

5. The method of claim 4, wherein the electronic receipt is billed against the payment card at a payment gateway.

6. The method of claim 1, further comprising receiving, by the server, an instruction from the merchant store, with which the electronic payment transaction is performed, to generate the electronic receipt; and wherein generating and storing the electronic receipt, by the server, includes generating and storing the electronic receipt, by the server, in response to the instruction received from the merchant store.

7. The method of claim 1, wherein generating and storing the electronic receipt, transmitting the electronic receipt to the mobile device, and transmitting the electronic receipt to the merchant store are performed in lieu of the merchant store printing a paper receipt for the electronic payment transaction.

8. A system for receiving an electronic receipt of an electronic payment transaction into a mobile device, the system comprising:

a processor associated with a merchant store, the processor configured to:

generate a unique transaction identity for the electronic payment transaction, for at least one purchase associated with the electronic payment transaction, based on a payment card used in the electronic payment transaction; and transmit the unique transaction identity to the mobile device for storing into an installed application in the mobile device; and a server having a processor configured to:

receive the unique transaction identity from the merchant store;

generate and store an electronic receipt for the electronic payment transaction;

transmit the electronic receipt to the mobile device after verifying that the electronic receipt matches against the unique transaction identity in the installed application, in response to a query from the mobile device for the electronic receipt issued for the electronic payment transaction; and transmit the electronic receipt to the merchant store in connection with the electronic payment transaction.

9. The system of claim 8, wherein the processor associated with the merchant store is further configured to receive details of a payment card from the mobile device, via a contactless sensor at the merchant store; and wherein the system further comprises a payment gateway having a processor configured to bill the electronic receipt against the payment card used for the electronic payment transaction based on the details of the payment card.

10. The system of claim 8, wherein the processor of the server is further configured to locate the mobile device used to perform the electronic payment transaction for verification of the electronic receipt.

11. The system of claim 8, wherein the processor of the server is further configured to receive, from the installed application in the mobile device, the query for the electronic receipt.

12. The system of claim 11, wherein the query includes the unique transaction identity in the installed application, the unique transaction identity being encrypted; and wherein the processor of the server is configured to decrypt the unique transaction identity prior to verifying that the electronic receipt matches against the unique transaction identity in the installed application.

13. The system of claim 8, wherein the processor of the server is configured to generate the electronic receipt only after the electronic receipt is billed against the payment card used for the electronic payment transaction.

14. The system of claim 8, wherein the electronic receipt includes line item data for the at least one purchase associated with the electronic payment transaction.

15. The system of claim 8, wherein the processor of the server is configured to generate and store the electronic receipt, transmit the electronic receipt to the mobile device, and transmit the electronic receipt to the merchant store in lieu of the processor associated with the merchant store being configured to print a paper receipt for the electronic payment transaction.

* * * * *